United States Patent [19]
Saito et al.

[11] Patent Number: 4,667,241
[45] Date of Patent: May 19, 1987

[54] GHOST CANCELLING SYSTEM

[75] Inventors: Junya Saito; Hisafumi Yamada; Ichiro Tsutsui, all of Shinagawa, Japan

[73] Assignee: Sony Corporation, Tokyo, Japan

[21] Appl. No.: 694,405

[22] PCT Filed: May 16, 1984

[86] PCT No.: PCT/JP84/00244
§ 371 Date: Jan. 10, 1985
§ 102(e) Date: Jan. 10, 1985

[87] PCT Pub. No.: WO84/04643
PCT Pub. Date: Nov. 22, 1984

[30] Foreign Application Priority Data
May 19, 1983 [JP] Japan .................................. 58-88207

[51] Int. Cl.⁴ .............................................. H04N 5/21
[52] U.S. Cl. ..................................... 358/167; 358/905; 455/296
[58] Field of Search ......................... 358/167, 36, 905; 455/296, 302, 303

[56] References Cited

U.S. PATENT DOCUMENTS

| | | | |
|---|---|---|---|
| 4,344,089 | 8/1982 | Ustunomiya | 358/905 |
| 4,357,631 | 11/1982 | Utsunomiya | 358/167 |
| 4,517,601 | 5/1985 | Yamada | 358/167 |

FOREIGN PATENT DOCUMENTS

| | | | |
|---|---|---|---|
| 5478 | 1/1982 | Japan | 358/905 |
| 5441 | 1/1982 | Japan | 358/167 |
| 108874 | 6/1983 | Japan | 358/905 |

Primary Examiner—Tommy P. Chin

[57] ABSTRACT

A ghost cancelling system has a transversal filter connected to a video signal source to produce a ghost cancelling signal, composed with a video signal from the video signal source by use of a composer. A circuit is provided for detecting a ghost level during a predetermined period, including a masking pulse forming circuit and a detecting circuit for detecting a reference time point, a circuit for forming a standard waveform from the output of the detecting circuit, a circuit for subtracting the standard waveform from the video signal derived from the composer, and a circuit for detecting a ghost level from the output of the subtracting circuit. A signal derived from the masking pulse is supplied to the transversal filter for controlling its operation.

8 Claims, 52 Drawing Figures

FIG. 2
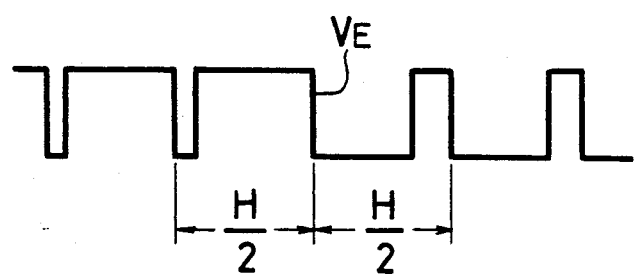
FIG. 3A
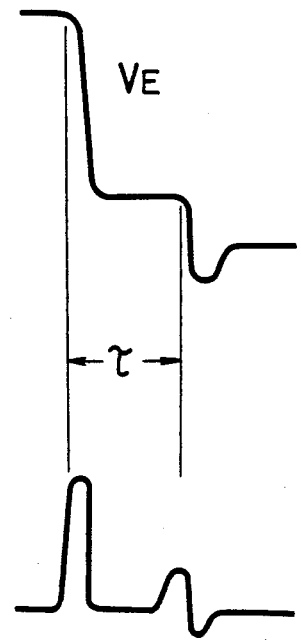
FIG. 3B

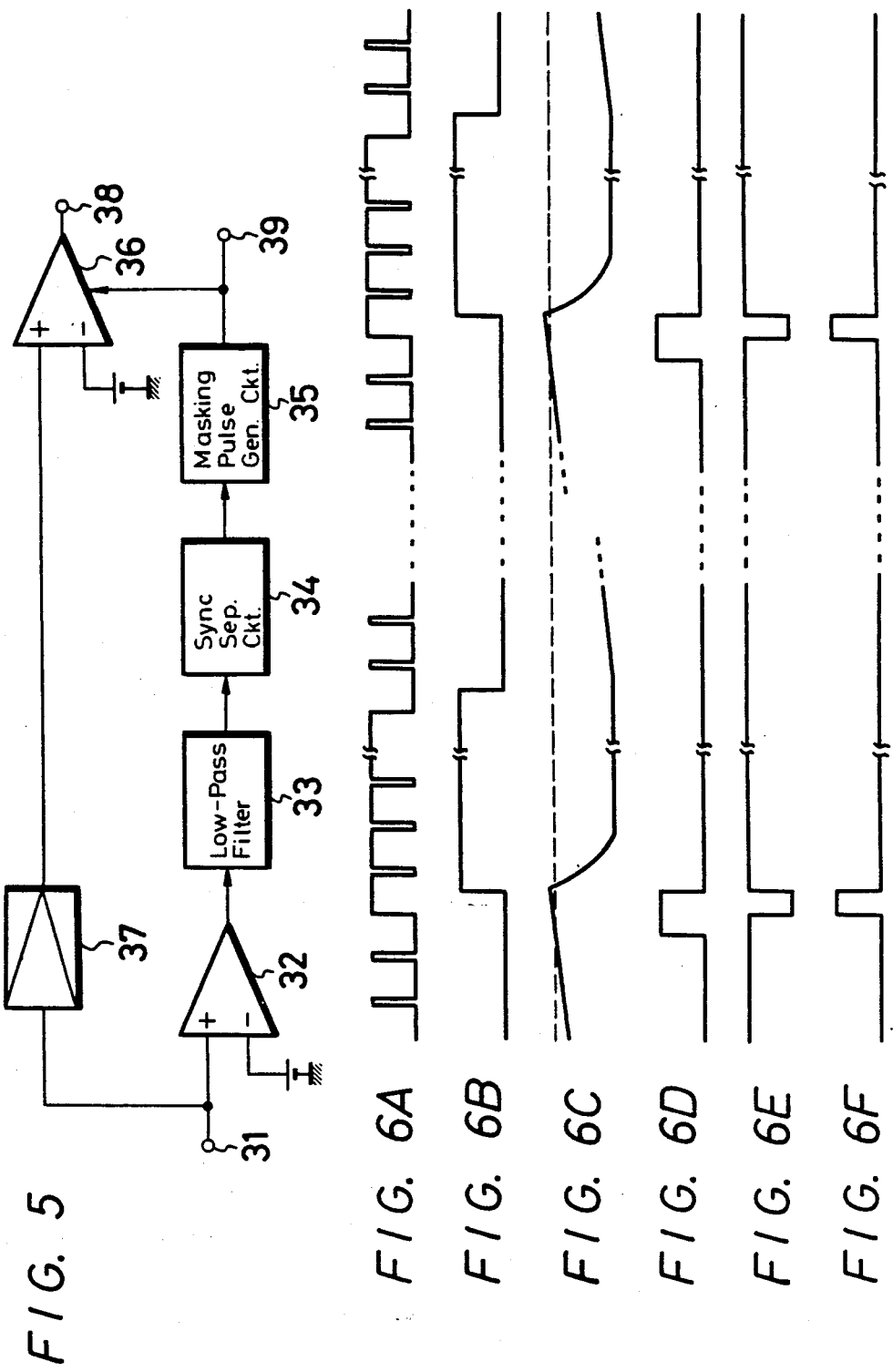

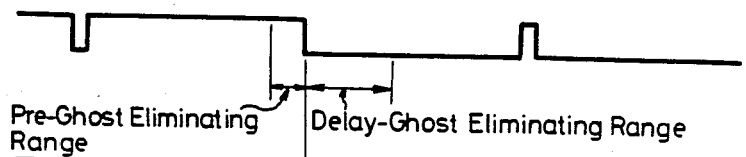
FIG. 14A
Pre-Ghost Eliminating Range — Delay-Ghost Eliminating Range
FIG. 14B
FIG. 14C
FIG. 14D
FIG. 14E
FIG. 14F
FIG. 14G
FIG. 14H
FIG. 14I
Pre-Ghost Detecting Period — Delay-Ghost Detecting Period
FIG. 14J
FIG. 14K
FIG. 14L
FIG. 14M
FIG. 14N
FIG. 14O

4,667,241

GHOST CANCELLING SYSTEM

TECHNICAL FIELD

This invention relates to a ghost cancelling system for cancelling out a ghost at a stage of, for example, a video signal.

BACKGROUND ART

The following ghost cancelling system has been proposed in the prior art. As, for example, shown in FIG. 1, a signal received by an antenna 1 is supplied through a tuner 2 and a video intermediate frequency amplifier 3 to a video detector circuit 4 which then detects a video signal. This video signal is supplied through a delay circuit 5 with a delay time corresponding to the eliminating period of a pre-ghost to a composer 6 and a ghost cancelling signal imitating the ghost derived from a transversal filter that will be described later is supplied to the composer 6 so that the video signal with the ghost cancelled out is delivered from the composer 6 to an output terminal 7.

The video signal derived from the video detector circuit 4 is supplied to a delay circuit 8 that forms a part of the transversal filter. In this delay circuit 8, delay elements, each of which takes a sampling period (for example, 10 [ns] (nano seconds)) as a unit of delay, are connected in a plurality of stages (n number) to establish a delay time equal to the eliminating period of the pre-ghost and, n taps are led out from the respective stages. The signals from these n taps are respectively supplied to weighting circuits $9_1, 9_2, \ldots 9_n$ each of which is formed of a multiplier.

The signal from the end of the delay circuit 8 is supplied to a terminal $10f$ of a mode switch 10 and the output signal from the composer 6 is supplied to the other terminal $10b$ of the mode switch 10. The signal derived from this mode switch 10 is supplied to a delay circuit 11. This delay circuit 11 is formed of delay elements, each delay element taking a sampling period as a unit delay time, connected in a plurality of stages (m number) to have a delay time equal to an eliminating period of a delay-ghost and m taps are led out from the respective stages thereof. The signals from these taps are respectively supplied to weighting circuits $12_1, 12_2, \ldots 12_n$, each of which is formed of a multiplier.

The video signal from the composer 6 is supplied to a subtracting circuit 13. Further, the video signal from the delay circuit 5 is supplied to a synchronizing separator circuit 14 and the separated synchronizing signal therefrom is fed to a standard wave forming circuit 15 and a low-pass filter 16 by which a standard waveform approximate to a step-waveform of a rising edge VE of the vertical synchronizing signal is formed. This standard waveform is supplied to the subtracting circuit 13.

The signal from this subtracting circuit 13 is supplied to a differentiation circuit 17 which then detects the ghost.

For the ghost detecting signal, there is employed such a signal that is contained in a standard television signal and which is not affected by other signals during the period as long as possible, for example, the vertical synchronizing signal. That is, as shown in FIG. 2, the periods $\pm \frac{1}{2}$ H (H is the horizontal period) before and after the rising edge VE of the vertical synchronizing signal are not affected by other signals. Therefore, the afore-noted standard waveform is subtracted from the signal in this period and the subtracted signal is differentiated to thereby detect a weighting factor.

When there is contained a ghost with a phase difference of 45° from a desired signal and with a delay time $\tau (=\omega_c \tau$ where $\omega_c$ is the video carrier angular frequency in the high frequency stage), the video signal with the waveform as shown in FIG. 3A appears. While, if this signal is differentiated and inverted in polarity, a ghost detecting signal with a differentiation waveform as shown in FIG. 3B is provided. This differentiation waveform can approximately be regarded as an impulse response to the ghost.

The ghost detecting signal of the differentiation waveform appearing from the differentiation circuit 17 is supplied through an amplifier 18 to demultiplexers 19 and 20 which are connected in series. The demultiplexers 19 and 20 each have such a construction similar to the delay circuits 8 and 11 in which delay elements, each of which takes a sampling period as a unit of delay time, are connected in a plurality of stages and m and n taps are led out from the respective stages thereof. The outputs of the respective taps are respectively supplied to switching circuits $21_1, 21_2, \ldots 21_n$ and $22_1, 22_2, \ldots 22_m$.

The vertical synchronizing signal from the synchronizing separator circuit 14 is fed to a gate pulse generator 23 which then generates a gate pulse having a pulse width corresponding to an interval from the rising edge VE of the synchronizing signal to the last end of the $\frac{1}{2}$ H period. On the basis of this gate pulse, the switching circuits $21_1$ to $22_m$ are turned on, respectively.

The signals from the switching circuits $21_1$ to $22_m$ are respectively supplied to analog accumulative adders $24_1, 24_2 \ldots 24_n$ and $25_1, 25_2, \ldots 25_m$. The signals from these analog accumulative adders $24_1$ to $25_m$ are respectively supplied to the weighting circuits $9_1$ to $9_n$ and $12_1$ to $12_m$.

The outputs of these weighting circuits $9_1$ to $9_n$ and $12_1$ to $12_m$ are added together in an adding circuit 26 to form a ghost cancelling signal. This ghost cancelling signal is supplied to the composer 6.

As described above, the delay circuits 8 and 11, the weighting circuits $9_1$ to $9_n$ and $12_1$ to $12_m$ and the adding circuit 26 constitute the transversal filter and thereby the ghost is cancelled out. In this case, even after the deformation of the waveform in the periods from the rising edge of a certain vertical synchronizing signal and the $\pm \frac{1}{2}$ H before and after the foregoing rising edge is detected and then a weighting factor is decided, if there still remains a ghost which is not cancelled out, in order to carry out the above detection and to reduce the remaining ghost, there are provided the analog accumulative adders $24_1$ to $25_m$, respectively.

The changing of the mode switch 10 enables the delay-ghost cancelling to be selectively changed from the feedforward mode to the feedback mode and vice versa.

FIG. 4 shows a case in which an input-adding type transversal filter is employed to cancel out a ghost. In the figure, like parts corresponding to those in FIG. 1 are marked with the same references and will not be described in detail.

In the figure, the video signal derived from the video detector circuit 4 is supplied to the weighting circuits $9_1$ to $9_n$ and the signals from the weighting circuits $9_1$ to $9_n$ are respectively supplied to input terminals of a delay circuit $8'$. This delay circuit $8'$ consists of delay elements, each of which takes a sampling period as a unit, connected in n stages and n input terminals provided at respective stages between adjacent ones.

The signals at the input and output sides of the composer 6 are supplied to terminals 10f' and 10b' of a mode switch 10'. The signal from this mode switch 10' is supplied to the weighting circuits 12₁ to 12$_m$ and the signals from these weighting circuits 12₁ to 12$_m$ are respectively supplied to input terminals of a delay circuit 11'. This delay circuit 11' consists of delay elements, each delay element having a sampling period as a unit, connected in m stages and m input terminals provided at respective stages between adjacent ones.

The signals respectively derived from the ends of these delay circuits 8' and 11' are added together in an adding circuit 26' to form a ghost cancelling signal. This ghost cancelling signal is supplied to the composer 6.

With this circuit arrangement, similarly to the ghost cancelling circuit that employs the afore-noted output adding type transversal filter, the ghost can be cancelled out, too.

Further, in the above circuit, it may be possible that without providing the differentiation circuit 17, the difference between the outputs of the adjacent bits of the demultiplexers 19 and 20 is used to produce a differential output and the weighting can be carried out by using this differential output.

Furthermore, it may be possible that the demultiplexers 19 and 20 and the delay circuits 8 and 11 are made common, upon weighting, the weighting signal is supplied to the delay circuit, stored in a memory circuit, and thereafter the weighting is carried out by the stored signal.

As described above, it is possible to cancel out the ghost in the video signal stage.

In the above ghost cancelling system, the generation of the standard waveform and the switching timing of the switching circuits 21₁ to 22$_m$ take the rising edge of, for example, the vertical synchronizing signal as a reference time point. In this case, it is requested that the reference time point is detected with very high precision and it is experimentally confirmed that the accuracy within 35n sec is required.

However, since the prior art synchronizing separator circuit includes a low-pass filter in its circuitry, information of high frequency band is dropped out and the rising edge of the signal or the like is blunted. Therefore, there is then a fear that if the reference time point is detected from the vertical synchronizing signal thus separated, a time delay will occur.

On the other hand, it is proposed that a masking pulse of about ½ H period including the rising edge of, for example, the vertical synchronizing signal is formed and the transit of the rising edge is directly detected by using this masking pulse and the video signal.

In this method, however, if the masking pulse is formed at incorrect position due to the influence of noise and so on, there may be such a fear that a different transit is detected with the result that the reference time point becomes incorrect much. This is a serious problem particularly because the ghost cancelling system is frequently used in the poor S/N (signal-to-noise) ratio such as a weak electric field and the like.

By the way, since the width of the masking pulse may be ½ H period including the rising edge of the vertical synchronizing signal, it is not requested that this masking pulse is formed with so high accuracy. Further, since the prior art synchronizing separator circuit with a low-pass filter includes the low-pass filter, noise is suppressed and this synchronizing separator circuit is less in mis-operation.

Therefore, the present inventor has previously proposed the following circuit. In FIG. 5, reference numeral 31 designates an input terminal to which a video signal is supplied. The signal from this terminal 31 is supplied to a synchronizing separator circuit that consists of a comparator 32 and a low-pass filter 33, and the signal (FIG. 6A) from the low-pass filter 33 is supplied to a synchronizing separator circuit 34 consisting of a low-pass filter. The vertical synchronizing signal (FIG. 6B) separated by this separator circuit 34 is supplied to a masking pulse generating circuit 35 which then generates, for example, a triangular wave (FIG. 6C). And, on the basis of this triangular wave and the reference potential (shown by a broken line), there is formed a masking pulse (FIG. 6D) that corresponds to ½ H period including the rising edge of the vertical synchronizing signal. This masking pulse is supplied to the control terminal of a comparator 36. Further, the signal applied to the terminal 31 is supplied through an amplifier 37 to the comparator 36. When the falling edge of the signal, for example, is detected by the comparator 36, the rising edge (FIG. 6E) of the vertical synchronizing signal, which will become the reference time point, is detected and then developed at an output terminal 38 is a $t=0$ pulse (FIG. 6F) that results from inverting the above rising edge of the vertical synchronizing signal.

Alternatively, in FIG. 7, the signal from the input terminal 31 is supplied through a clamping capacitor 41 to the connection point between a resistor 43 and a constant current source 44 in a series circuit formed of a transistor 42, the resistor 43 and the constant current source 44 which forms a bias circuit. The signal at the connection point is supplied to a base of one transistor 45 which forms a differential amplifier, while a base of the other transistor 46 is supplied with a voltage from the connection point between a resistor 48 and a constant current source 49 in a series circuit formed of a transistor 47, the resistor 48 and the constant current source 49 that forms a bias circuit. Then, the signal current flowing through the collector of the transistor 45 is derived through a current mirror circuit 50.

Further, this signal is supplied through a switch 51 to a low-pass filter 52 and a buffer amplifier 53 and also supplied through a switch 54 to a low-pass filter 55 and a buffer amplifier 56. The signals from these buffer amplifiers 53 and 56 are added together by resistors 57 and 58 and then fed to a comparator 59. Also, the signal from the current mirror circuit 50 is supplied to the comparator 59.

The signal from this comparator 59 is supplied to a clock terminal of a D-type flip-flop circuit 60. The masking pulse from the generator circuit 35 is supplied to the D terminal of the flip-flop circuit 60 and at the same time the polarity thereof is inverted and then supplied to the clear terminal of the flip-flop circuit 60, whereby the output of the flip-flop circuit 60 is developed at the output terminal 38.

In this circuitry, from the current mirror circuit 50 derived is a signal as, for example, shown in FIG. 8A. For this signal, the switches 51 and 54 are respectively turned on during the periods as, for example, shown in FIGS. 8B and 8C. Accordingly, the buffer amplifiers 53 and 56 respectively produce potentials ($E_l$ and $E_2$) which are respectively correspond to the pedestal and the sync tip level of the synchronizing signal. These potentials are added together by the resistors 57 and 58.

If the resistance values of the resistors 57 and 58 are respectively taken as $R_1$ and $R_2$, a potential $E_3$ that results from the addition becomes as $$E_3 = \frac{E_1 R_2 + E_2 R_1}{R_1 + R_2}$$

If the condition $R_2 < R_1$ is satisfied, the above potential $E_3$ becomes as $$E_3 < \frac{E_1 + E_2}{2}$$

When this potential $E_3$ is supplied to the comparator 59, the comparator 59 produces a signal as shown in FIG. 8D. While, the masking pulse generating circuit 35 produces a signal as shown in FIG. 8E. When these signals are supplied to the flip-flop circuit 60, a signal as shown in FIG. 8F is developed at the output terminal 38.

As described above, the reference time point is detected.

However, in these apparatus, the gate pulse that makes the switches $21_1$ to $21_n$ and $22_1$ to $22_m$ on is formed by using a time point which is delayed by a delay time corresponding to the delay time of the demultiplexer 19 for the delay-ghost is calculated from the time point of the rising edge of, for example, the vertical synchronizing signal by a monostable multivibrator and the like. Accordingly, when the delay characteristics of the monostable multivibrator and the demultiplexer are changed due to the change of temperature and so on, the time point at which the switch is turned on is displaced and hence there is a fear that the correct memory is no longer carried out.

Therefore, in order to remove the above shortcoming, the following method is considered.

In FIG. 9, the signal from the synchronizing separator circuit 14 is supplied to a pilot signal generating circuit 61 which then produces a pilot signal as shown in FIG. 10B at the time point corresponding to the rising edge of the vertical synchronizing signal as shown in FIG. 10A. This signal is supplied to an adder 62 that is provided between the amplifier 18 and the demultiplexer 19, in which it is superimposed on the ghost detection signal. Accordingly, after the detection period T0 shown in FIG. 10C elapses, the above pilot signal is produced at the last tap of the demultiplexer 19. The signal on the last tap is supplied to a pilot pulse detecting circuit 63 and the detected signal therefrom is supplied to a waveform shaping circuit 64 which then produces a gate pulse signal.

Since at this time point the ghost detection signals in the ghost detection interval are respectively distributed on the respective taps of the demultiplexers 19 and 20 and the gate pulse signal is produced at this time point, the signals on the respective taps are stored in the analog accumulative adders $24_1$ to $24_n$ and $25_1$ to $25_m$.

As described above, the ghost detecting signals are stored in the weighting storing analog accumulative adders $24_1$ to $24_n$ and $25_1$ to $25_m$.

However, in the case of this apparatus, since the detection of the pilot pulse is carried out at the intermediate stage between the demultiplexers 19 and 20, the inserted pilot signal affects at least one of the outputs from the demultiplexers 19 and 20 so that the correct weighting becomes impossible.

DISCLOSURE OF INVENTION

In accordance with this invention, in view of the above aspect, it becomes possible to carry out satisfactory weighting by a simple circuit construction.

BRIEF DESCRIPTION OF DRAWINGS

FIGS. 2 and 3A, 3B illustrate waveforms occuring during operation of the apparatus of FIG. 1;

FIG. 5 is a functional block diagram of apparatus for generating a pulse at a reference time point;

FIGS. 6A-6F are a series of waveforms produced in the course of operation in the apparatus of FIG. 5;

FIGS. 14A-14D are a series of waveforms produced during operation of the apparatus of FIG. 13;

BEST MODE FOR CARRYING OUT THE INVENTION

Figure 1:
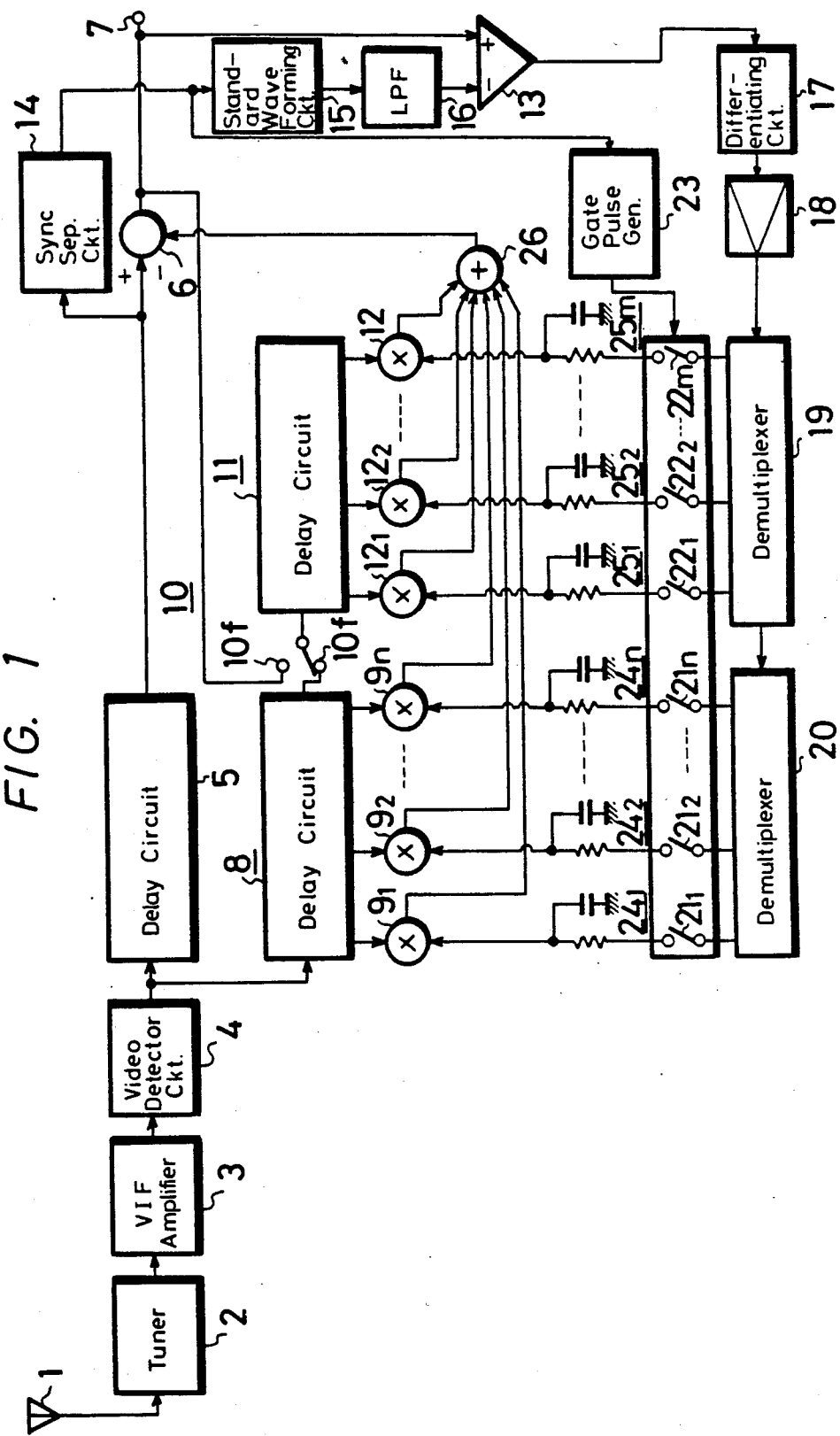
FIG. 1 is a functional block diagram of a ghost cancelling system proposed in the prior art.
Figure 4:
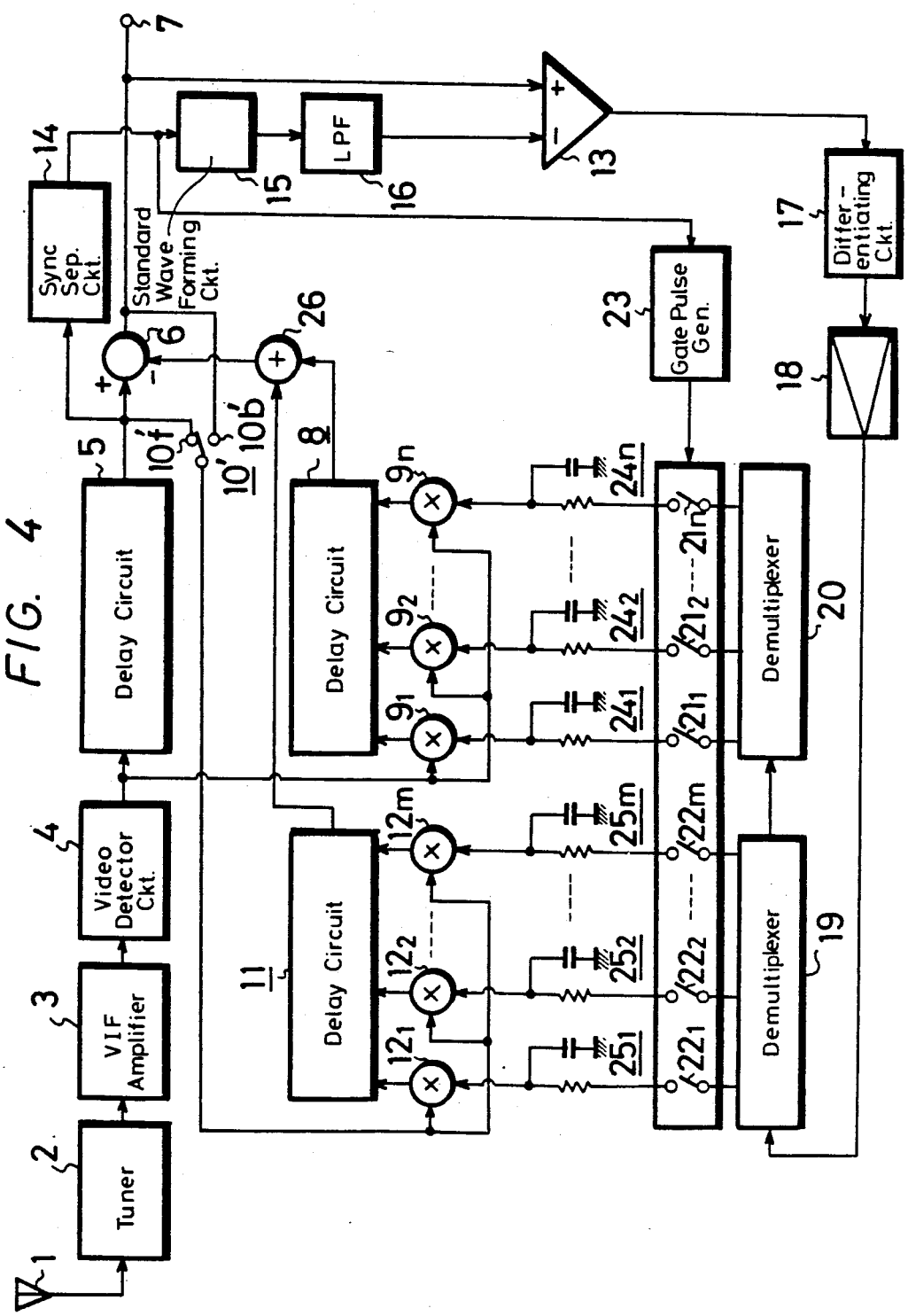
FIG. 4 is a functional block diagram of a ghost cancelling circuit employing an input-adding type transversal filter.
Figure 7:
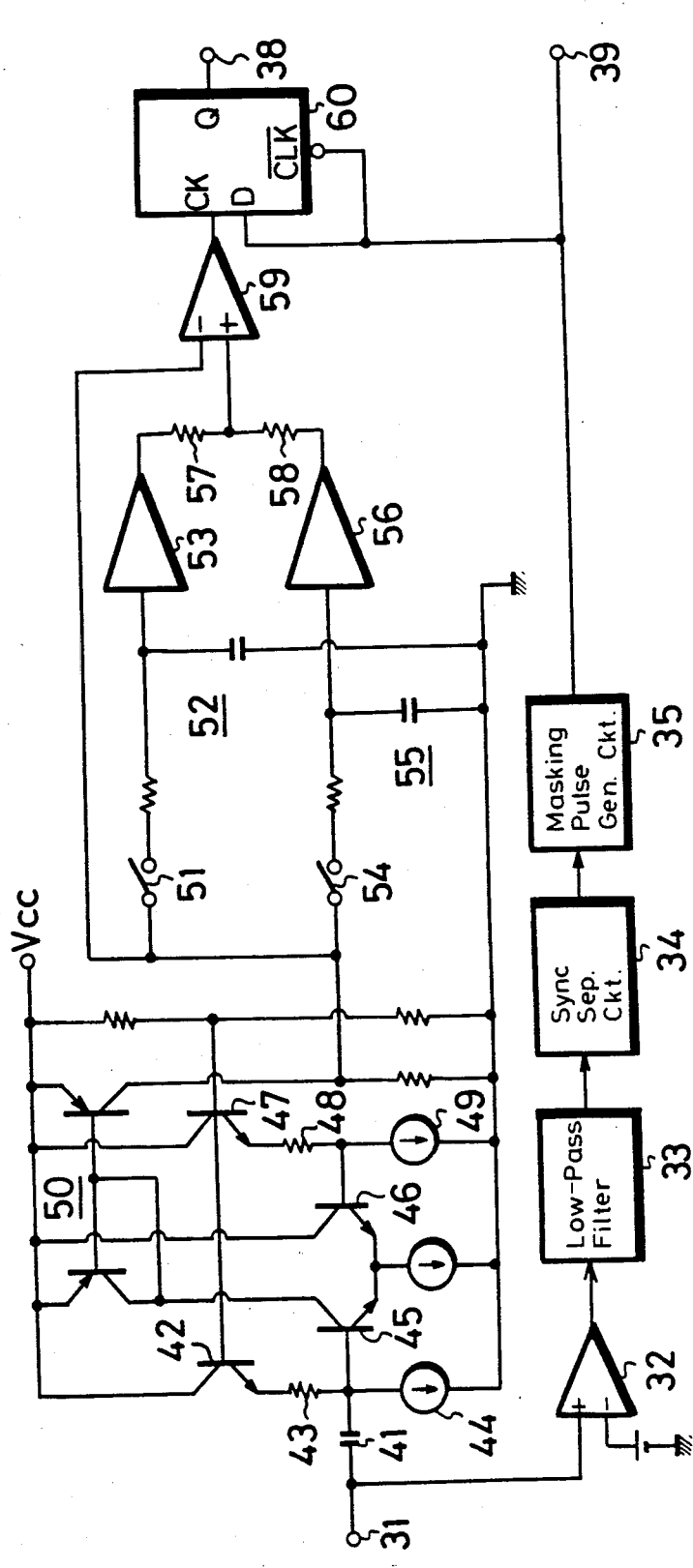
FIG. 7 is a functional block diagram, partly in schematic diagram form, of an alternative time pulse generation circuit.
Figure 8A:
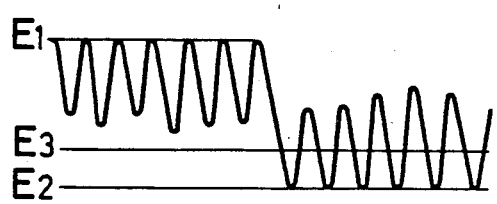
FIGS. 8A-8F are a series of waveforms illustrated in operation of the apparatus of FIG. 7.
Figure 8B:
Figure 8C:
Figure 8D:
Figure 8E:
Figure 8F:
Figure 10A:
FIGS. 10A-10D are a series of waveforms occuring during operation of the apparatus of FIG. 9.
Figure 10B:
Figure 10C:
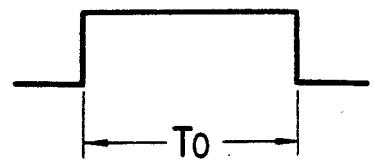
Figure 10D:
Figure 9:
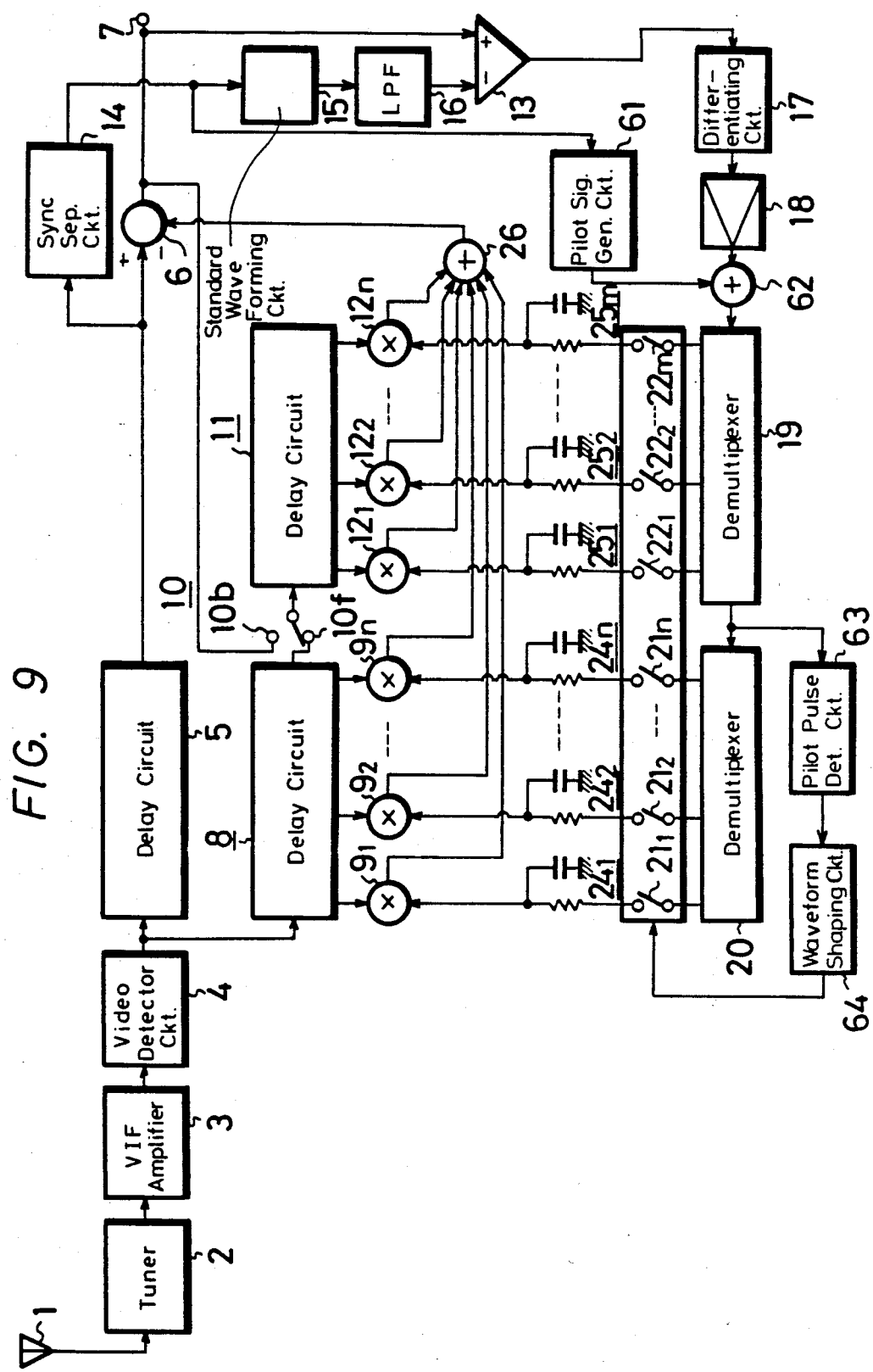
FIG. 9 is a functional block diagram of a modified ghost cancelling circuit.
Figure 11:
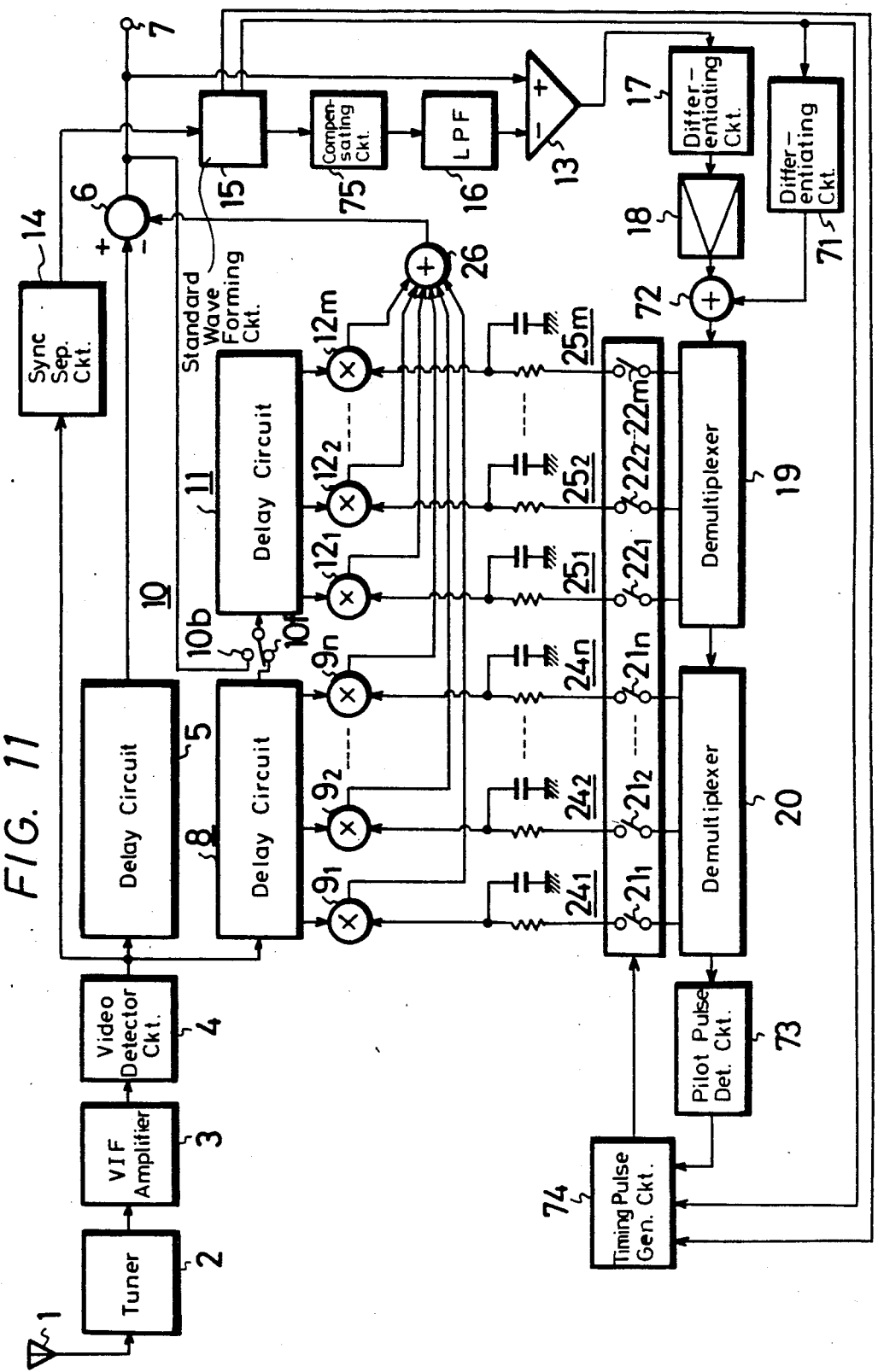
FIG. 11 is a functional block diagram of a ghost cancelling circuit in accordance with one embodiment of the invention, using an output-adding type transversal filter.
Figure 12:
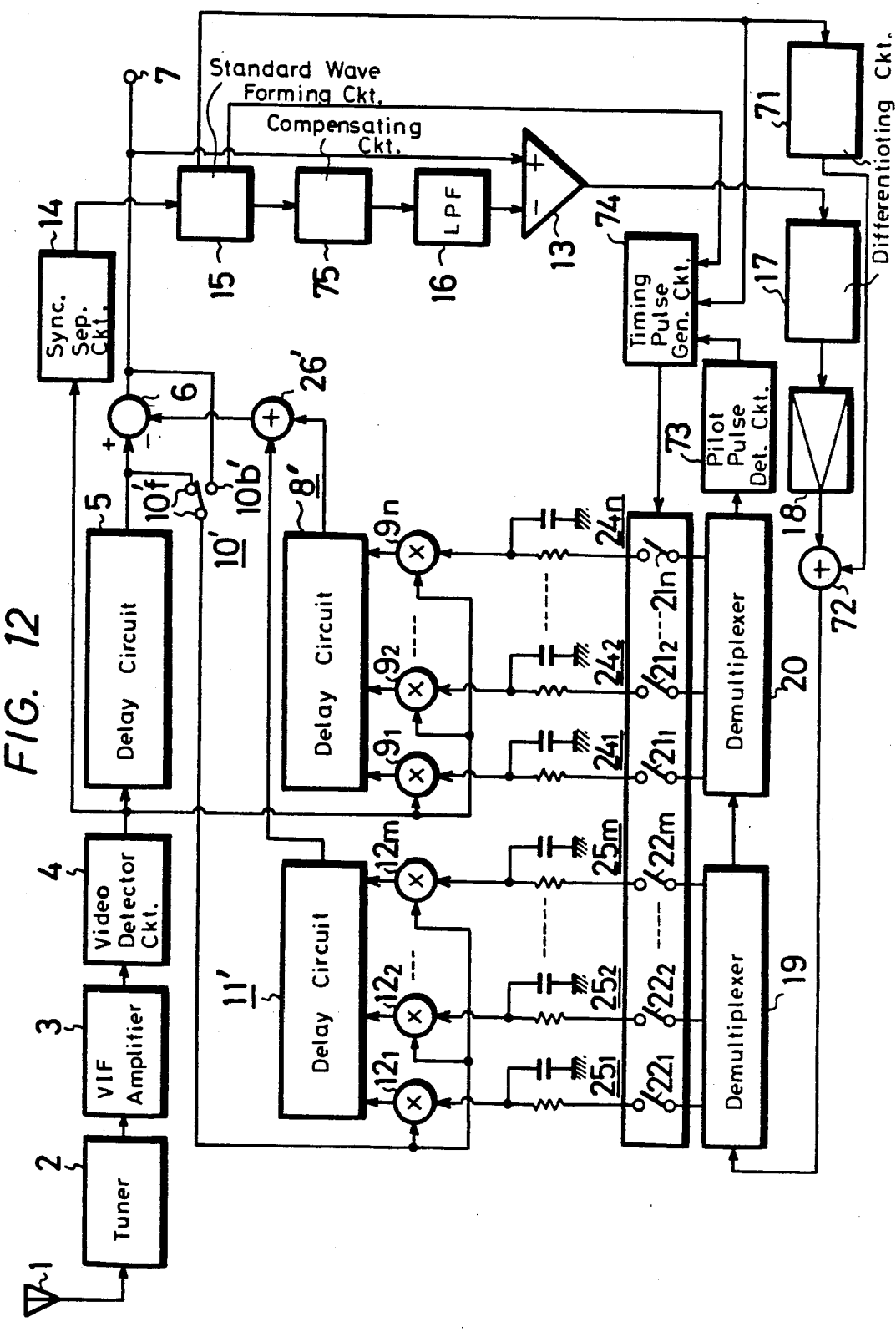
FIG. 12 is a functional block diagram of a ghost cancelling circuit incorporating an alternative emobodiment of the present invention, employing an input-adding type transversal filter.

FIGS. 11 and 12 respectively illustrate cases in which this invention is applied to the output-adding type and input-adding type transversal filters. In the figures, the input of the synchronizing separator circuit 14 is connected to the preceding stage of the pre-ghost correcting delay circuit 5, namely, the output of the video detector circuit 4. The masking pulse is derived from the standard waveform generating circuit 15 and this masking pulse is supplied to a differentiation circuit 71 which then produces a pilot pulse that corresponds to the rising edge. This pilot pulse is supplied to an adder 72 that is connected between the amplifier 18 and the demultiplexer 19. Further, the signal at the last tap of the demultiplexer 20 is supplied to a pilot pulse detecting circuit 73 and the detected pilot pulse is fed to a timing generating circuit 74. This generating circuit 74 is supplied with a t=0 pulse and the masking pulse from the standard waveform generating circuit 15. The t=0 pulse and the masking pulse are derived from the terminals 38 and 39 in FIGS. 5 and 7.

In the timing pulse generating circuit 74, a timing equal to the time difference between the rising edge of the masking pulse (input pilot pulse) and the output pilot pulse and with a time difference after the t=0 pulse is generated. On the basis of this timing, the gate pulse is generated to turn on the switches $21_1$ to $22_m$.

Between the standard waveform generating circuit 15 and the low-pass filter 16, there is provided a compensating circuit (monostable multivibrator and the like) 75 that has a delay time equivalent to that of the delay circuit 5.

As mentioned above, the weighting is carried out. According to this apparatus, since the pilot pulse is not detected at the intermediate stage of the demultiplexers but detected from the end of the pre-ghost cancelling demultiplexer unlike the prior art, there is no fear that a bad influence is exerted upon the ghost cancelling operation thereby.

Since the pilot pulse is produced at the timing of the rising edge of the masking pulse and the rising edge of the masking pulse is determined sufficiently before the pre-ghost cancelling range, the period in which the pilot pulse is derived from the demultiplexer 20 and the gate pulse is produced is sufficiently long. In this standpoint, it is possible to prevent the ghost cancelling operation from being affected by the insertion of the pilot pulse.

Figure 13:
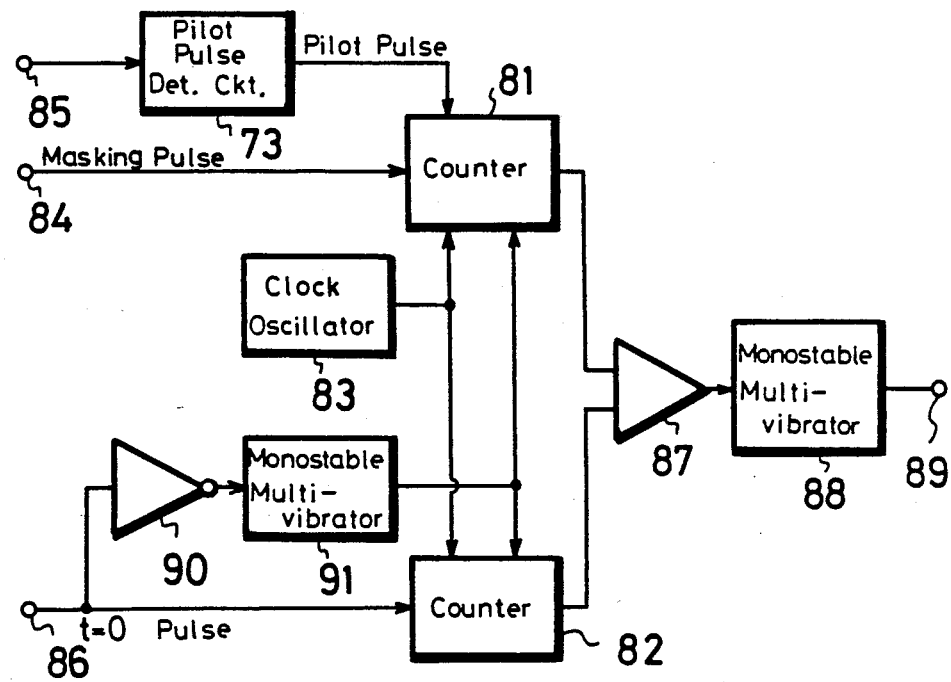
FIG. 13 is a functional block diagram of a timing pulse generating circuit.

FIG. 13 shows a practical example of the timing pulse generating circuit 74. In the figure, reference numerals 81 and 82 respectively designate counters, and the counters 81 and 82 count a clock pulse with the frequency of, for example, four times of the color subcarrier frequency from a clock oscillator 83. Reference numeral 84 designates a terminal to which the masking pulse is supplied. The masking pulse from this terminal 84 is supplied to the counter 81 and its counting is carried out during the period of this pulse. Reference numeral 85 designates a terminal to which the signal from the end of the demultiplexer 20 is supplied. This signal is supplied to the pilot pulse detector circuit 73 and the detected signal therefrom is supplied to the counter 81, by which its count operation is stopped. Reference numeral 86 designates a terminal to which the t=0 pulse is supplied. The t=0 pulse from this terminal 86 is supplied to the counter 82 which carries out its count operation during the period of this pulse. These count values are supplied to a comparator circuit 87, which then detects the time point at which the count value of the counter 82 reaches the count value that is held by the counter 81. This detected signal is supplied to a monostable multivibrator 88 by which the gate pulse is formed, which then is developed at an output terminal 89. Further, the t=0 pulse from the terminal 86 is supplied through an inverter 90 to a monostable multivibrator 91 which then generates the reset pulse. This reset pulse is fed to the counters 81 and 82.

In this circuitry, if there are an input signal as shown in FIG. 14A and an output signal of the delay circuit 5 as shown in FIG. 14B, the pre-ghost and delay-ghost cancelling ranges in this case become as shown in the figure. On the other hand, the masking pulse and the t=0 pulse are formed as shown in FIGS. 14C and 14D. The differentiation pulse of the rising edge of the masking pulse becomes as shown in FIG. 14E and an output which is obtained when this differentiation pulse (pilot pulse) passes through the demultiplexers 19 and 20 becomes as shown in FIG. 14F.

In this case, the count value of the counter 81 is increased from the rising edge of the masking pulse to the output time point of the pilot pulse as shown in FIG. 14G and this count value is held hereinafter. On the other hand, the count value of the counter 82 is increased to become full count after the t=0 pulse as shown in FIG. 14H. That is, the counters 81 and 82 are operated as the integrators that are used to respectively integrate time after the pulses. Then, in the counter 81, the delay time of the demultiplexers 19 and 20 is counted as the count value and this count value includes a fluctuation component caused by the temperature characteristic and the like of the demultiplexers 19 and 20. While, in the counter 82, the count operation is carried out after the t=0 pulse and when the count value becomes the count value that is equal to the delay time of the demultiplexers 19 and 20, the gate pulse is formed as shown in FIG. 14I.

Further, the monostable multivibrator 91 produces a reset pulse as shown in FIG. 14J.

Accordingly, in spite of the fluctuation of the delay time caused by the temperature characteristic and the like of the demultiplexers 19 and 20, at time when the signal of the detection period of the pre-ghost and delay-ghost is distributed into the demultiplexers 19 and 20, the gate pulse is formed.

By the way, since the above circuit uses the counters and so on, the circuitry becomes complicated in construction. Therefore, as, for example, shown in FIG. 15, the timing may be generated by using an integrator that utilizes the charging and discharging of a capacitor. In the figure, there is provided a switch 92 which is turned on by the masking pulse from the terminal 84 and which is turned off by the detected signal of the pilot pulse from the terminal 85'. A current from a constant current source 93 is supplied through this switch 92 to a capacitor 94. Also, there is provided a switch 95 that is turned on by the t=0 pulse from the terminal 86. A current from a constant current source 96 is supplied through this switch 95 to a capacitor 97. The terminal voltages across these capacitors 94 and 97 are supplied through buffer amplifiers 98 and 99 to a comparator 100. The output from the comparator 100 is supplied to the monostable multivibrator 88. Reset switches 101 and 102 are provided in parallel to the capacitors 94 and 97 and they are turned on by the output of the monostable multivibrator 91.

In this circuitry, the terminal voltages across the capacitors 94 and 97 become as shown in FIGS. 14K and 14L and the gate pulse is formed at the same timing as above. Since this circuit uses no counter and the like, the circuit arrangement thereof becomes very simple.

Figure 15:
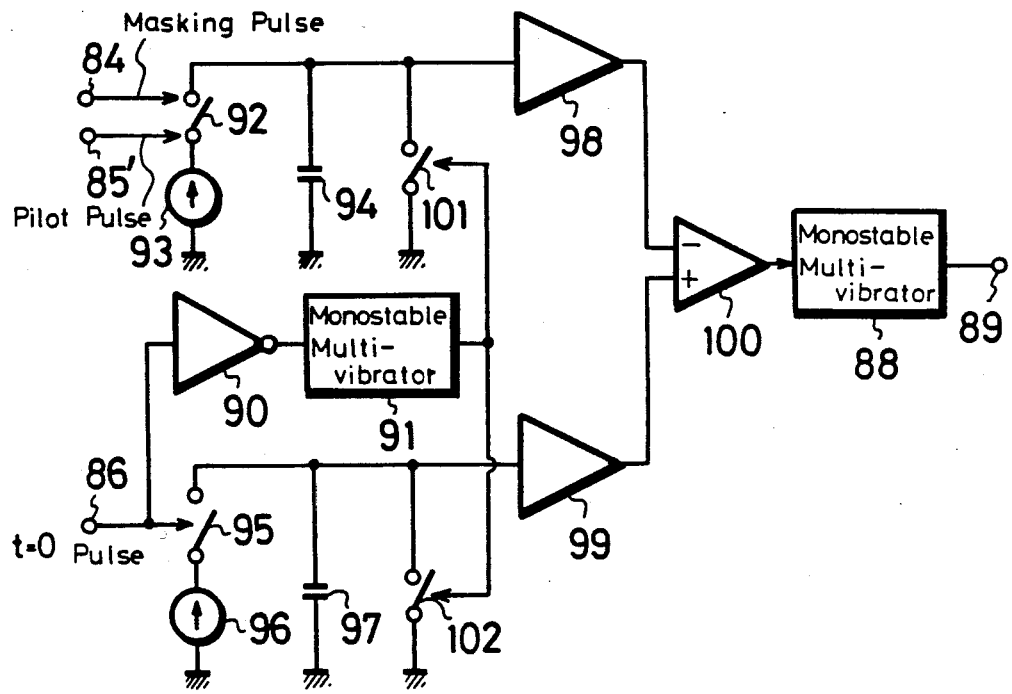
FIG. 15 is a functional block diagram of an alternative timing pulse generating circuit employing an integrator that uses a capacitor.
Figure 16:
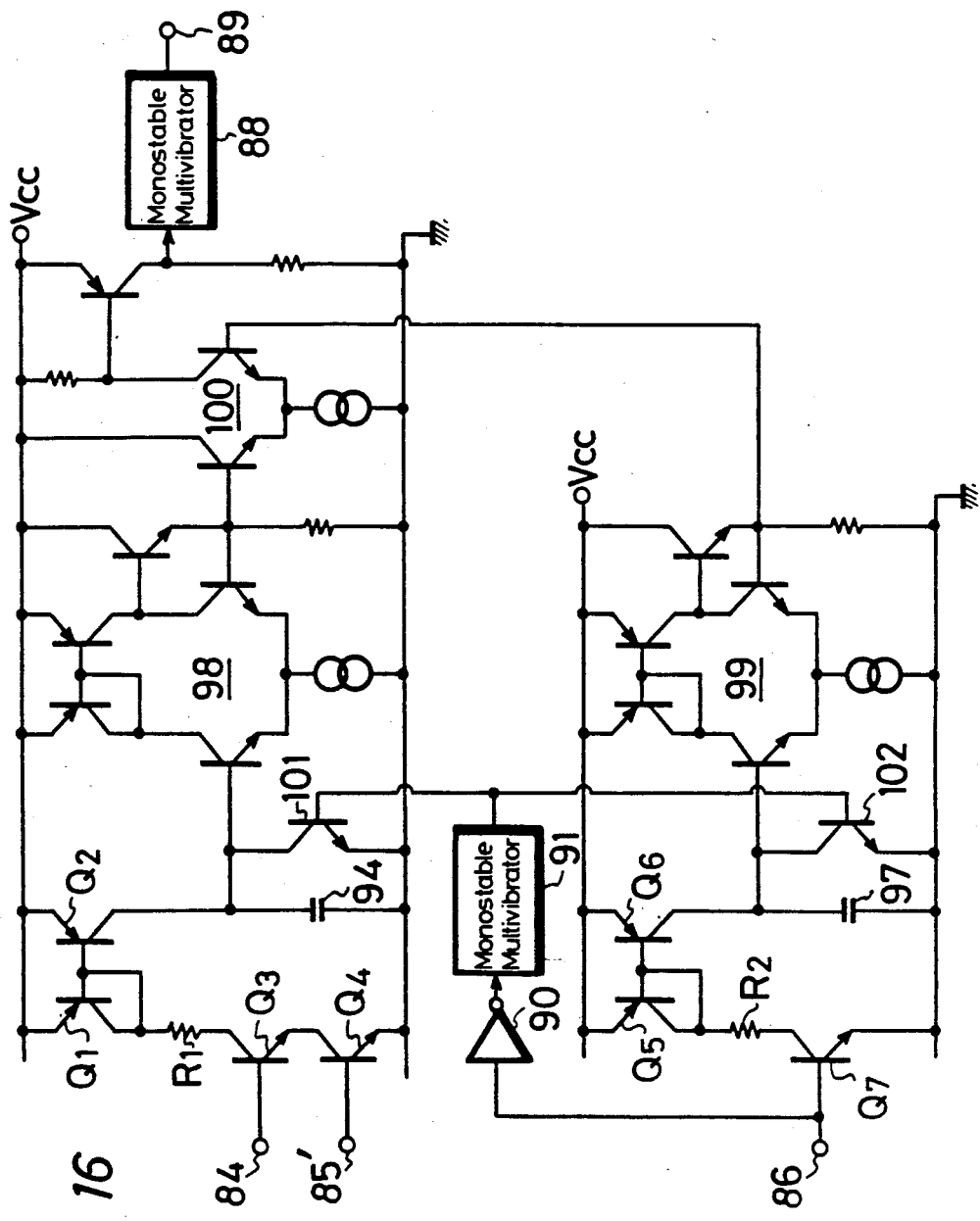
FIG. 16 is a schematic circuit diagram of an alternative timing pulse generator circuit which may be formed as an integrator circuit.

FIG. 16 shows a practical circuitry of the circuit shown in FIG. 15 and it is considered that this circuit in the figure will be formed as an IC. In the figure, like parts corresponding to those in FIG. 15 are marked with the same references.

In the figure, there is provided a current mirror circuit that is formed of transistors Q1 and Q2. Connected in series to the collector of this transistor Q1 are transistors Q3 and Q4 that are controlled by the signals from terminals 84 and 85'. The masking pulse applied to the terminal 84 is taken as a signal which is made high potential during that period, while the pilot pulse detecting signal applied to the terminal 85' is taken as such a signal which becomes low potential after the pilot pulse is detected. Accordingly, during the period from the rising edge of the masking pulse to the detection of the pilot pulse, the transistors Q3 and Q4 are respectively turned on whereby the constant current that is formed together with a resistor $R_1$ flows through the current mirror circuit. This current is charged in the capacitor 94 and the charged potential is supplied through the buffer amplifier 98 to the comparator 100.

Further, there is provided a current mirror circuit that is formed of transistors Q5 and Q6. Connected in series to the collector of the transistor Q5 is a transistor Q7 which is controlled by the signal from the terminal 86. In this case, the $t=0$ pulse applied to the terminal 86 is taken as such a signal which becomes high potential after $t=0$. Consequently, after $t=0$, the transistor Q7 is made on whereby the constant current, which is formed together with a resistor $R_2$ passes through the current mirror circuit. This current is charged in the capacitor 97 and the charged potential is supplied through the buffer amplifier 99 to the comparator 100.

Thus, the timing of the gate pulse is detected by the comparator 100.

While the reset switches 101 and 102 are connected in parallel to the capacitors 94 and 97 in FIGS. 15 and 16, they are not always required but instead, natural discharge will be good. However, if the buffer amplifiers 98 and 99 have high input impedance and the discharge is not carried out enoughly till the next vertical synchronizing pulse, the remaining charge is added to the next potential and becomes a constant voltage near the saturation level. Thus, there is then a risk that a mis-operation will occur in the gate pulse generating operation. To prevent such mis-operation from occurring, the reset circuit is inserted so as to discharge till at least the next vertical synchronizing signal. In the figure, the reset is carried out at the falling edge of the $t=0$ pulse. Since the capacitor 94 holds its potential during a certain period, particularly the buffer amplifier 98 is designed to have a high input impedance and the reset circuit is provided in this capacitor.

By the way, the present inventor has previously proposed the apparatus in which the delay circuits 8 and 11 and the demultiplexers 19 and 20 are divided into a plurality of ones so as to change the duration of the ghost cancelling period in accordance with the state of the ghost. In that case, in the above circuit, when the duration of the ghost cancelling period becomes long, the potential of the capacitor 94 reaches the saturation level so that the detection of the timing becomes impossible. In assuming the long duration of the ghost cancelling period, if the capacities of the capacitors 94 and 97 are increased or the current values of the constant current sources 93 and 96 are designed to be small, when the duration of the ghost cancelling period is short, the charging potential is low and the sufficient resolution can not be obtained.

Figure 17A:
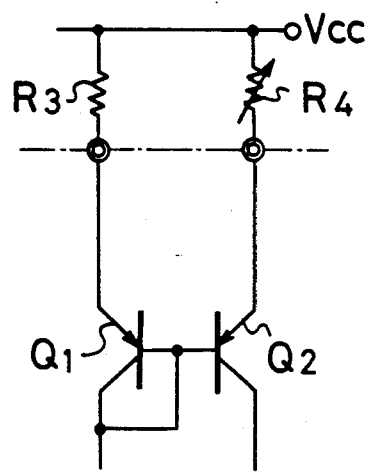
FIGS. 17A-17D illustrate possible modifications of the apparatus shown in FIG. 16.
Figure 17B:
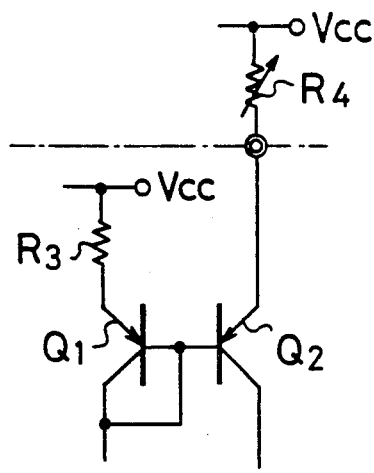
Figure 17C:
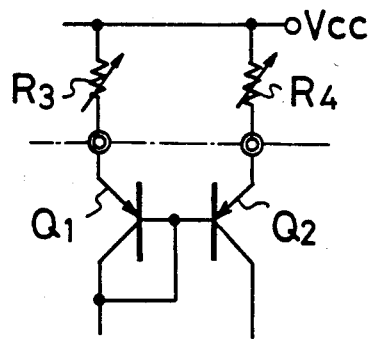
Figure 17D:
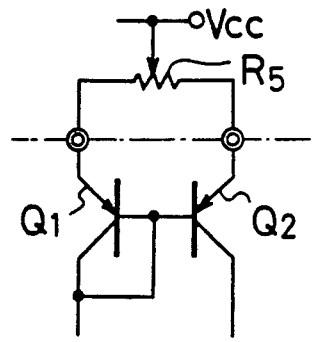

Therefore, as, for example, shown in FIG. 16, the emitter resistances of the transistors Q1, Q2, Q5 and Q6 that constitute the current mirror circuits are adjusted so that the charging current (time constant of the integrator) can be controlled in accordance with the duration of the ghost cancelling period. That is, in FIG. 17, at least one of the emitter resistances is made variable. FIG. 17A shows a case in which both resistors $R_3$ and $R_4$ are connected from the outside to the IC. In this case, the emitter of the transistor Q1 is connected with a fixed resistor and the emitter of the transistor Q2 is connected with a variable resistor. FIG. 17B shows a case in which the fixed resistor $R_3$ is provided within the IC. However, in this case, the fixed resistor and the variable resistor are different from each other in temperature characteristic and there is a fear that the mis-operation will occur due to the change of temperature. To avoid this defect, it is possible that as shown in FIG. 17C, the emitter resistors $R_3$ and $R_4$ are both formed of the variable resistor or that as shown in FIG. 17D, the both are controlled by a single variable resistor $R_5$. These circuits are similarly provided for the transistors Q5 and Q6.

Figure 18:
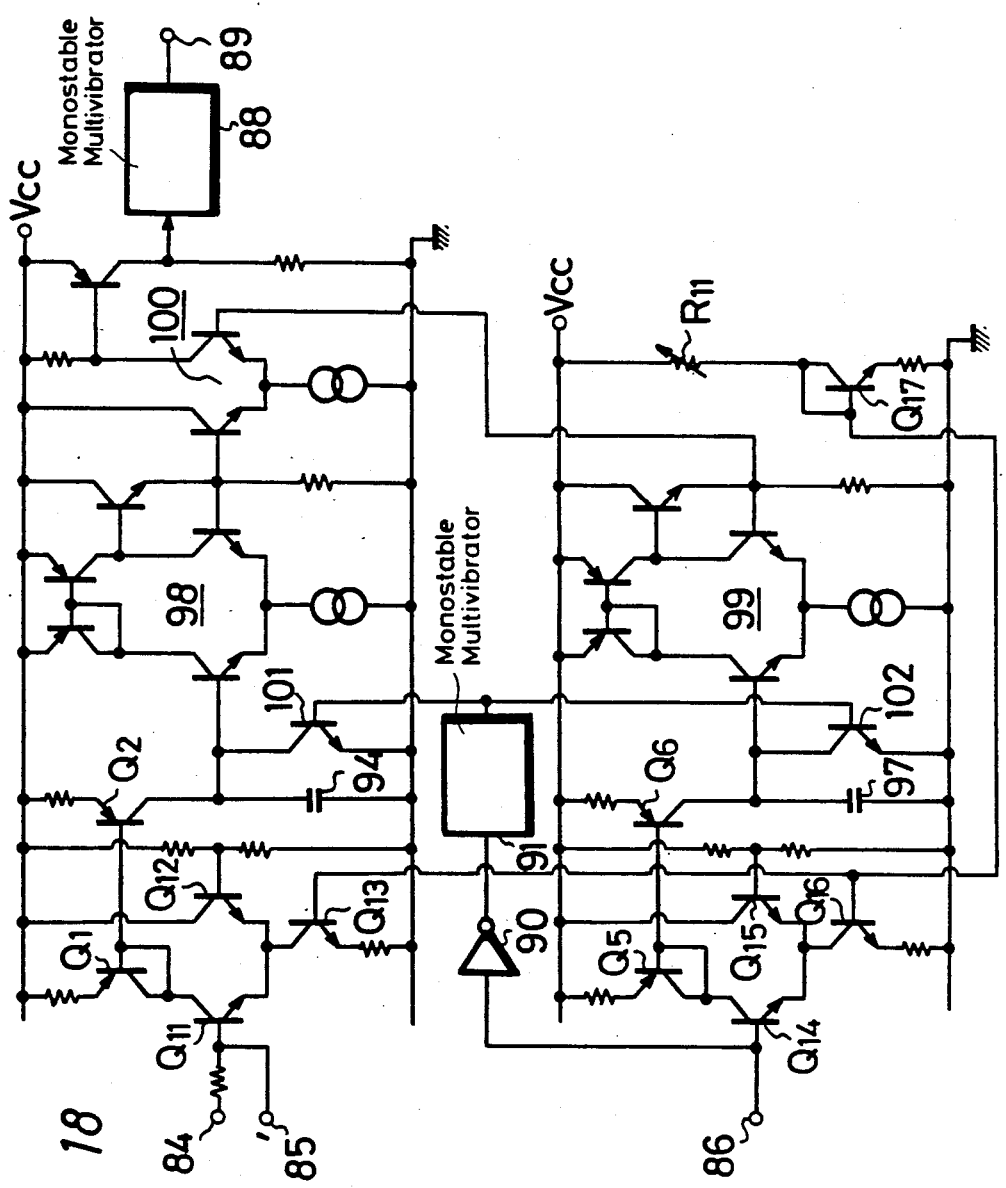
FIGS. 18-21 illustrate alternative forms of timing pulse generating circuits.

FIG. 18 shows other example in which the time constant of the integrator is changed. In the figure, like parts corresponding to those of the preceding figures are marked with the same references.

In the figure, there is provided a differential switching circuit that is formed of transistors Q11 and Q12, in which the terminals 84 and 85' are connected to the base of the transistor Q11, while a predetermined bias circuit is connected to the base of the other transistor Q12. The collector of the transistor Q11 is connected to the transistor Q1 and a constant current source transistor Q13 is connected to the emitters of the transistors Q11 and Q12.

Similarly, there is provided a differential switching circuit that is formed of transistors Q14 and Q15. The terminal 86 is connected to the base of the transistor Q14, while a predetermined bias circuit is connected to the base of the other transistor Q15. Further, the collector of the transistor Q14 is connected to the transistor Q5 and a constant current source transistor Q16 is connected to the emitters of the transistors Q14 and Q15.

The bases of the transistors Q13 and Q16 are commonly connected to a base of a transistor Q17 which forms a current mirror circuit and a variable resistor R11 is connected to the collector of the transistor Q17.

In this circuitry, when the variable resistor $R_{11}$ is adjusted, the value of a constant current flowing through the transistors Q13 and Q16 is controlled so as to change the time constants of the both integrators. In this case, there is an advantage that the two integrators can be adjusted only at one place.

Figure 19:
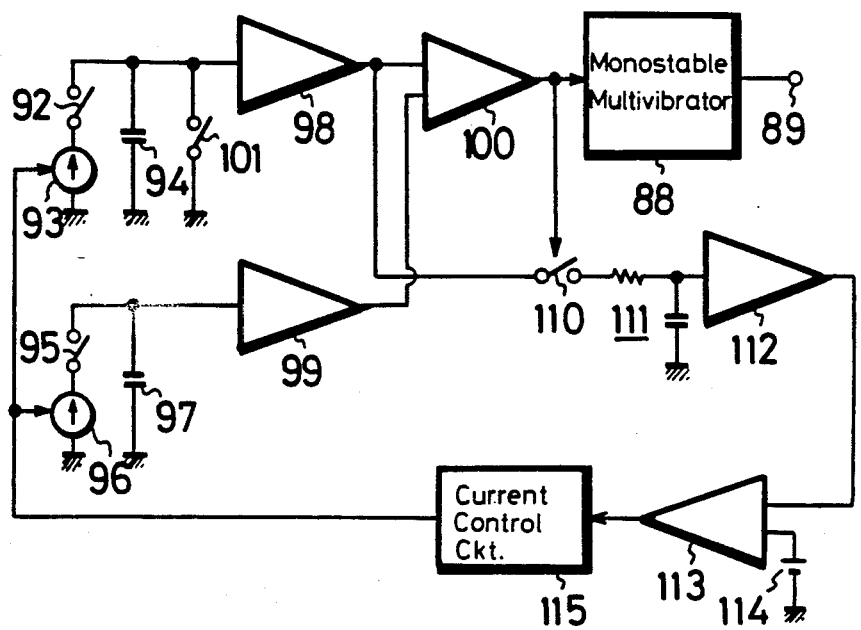

FIG. 19 shows a case in which the time constant of the above integrator is made free of the adjustment by the feedback. In the figure, the signal from the buffer amplifier 98 is supplied to a switch 110 and this switch 110 is made on by the gate pulse derived from the comparator 100 so that the potential (holding potential at that time is sampled. This potential is supplied through a low-pass filter 111 and a buffer amplifier 112 to a comparator 113, in which this potential is compared with a reference voltage from a reference voltage source 114. The compared output is supplied to a current control circuit 115 which then controls the constant current sources 93 and 96.

Thus, the current values are controlled such that the output waveforms of the buffer amplifiers 98 and 99 and the comparator 100 respectively become as, for example, shown in FIGS. 14M, 14N and 14O in which the integrated values become constant in accordance with the duration of the ghost cancelling period. Then, if the duration of the ghost cancelling period is short, the inclination is large as shown by a, while if the duration of the ghost cancelling period is long, the inclination is made small as shown by b in the figure.

Figure 20:
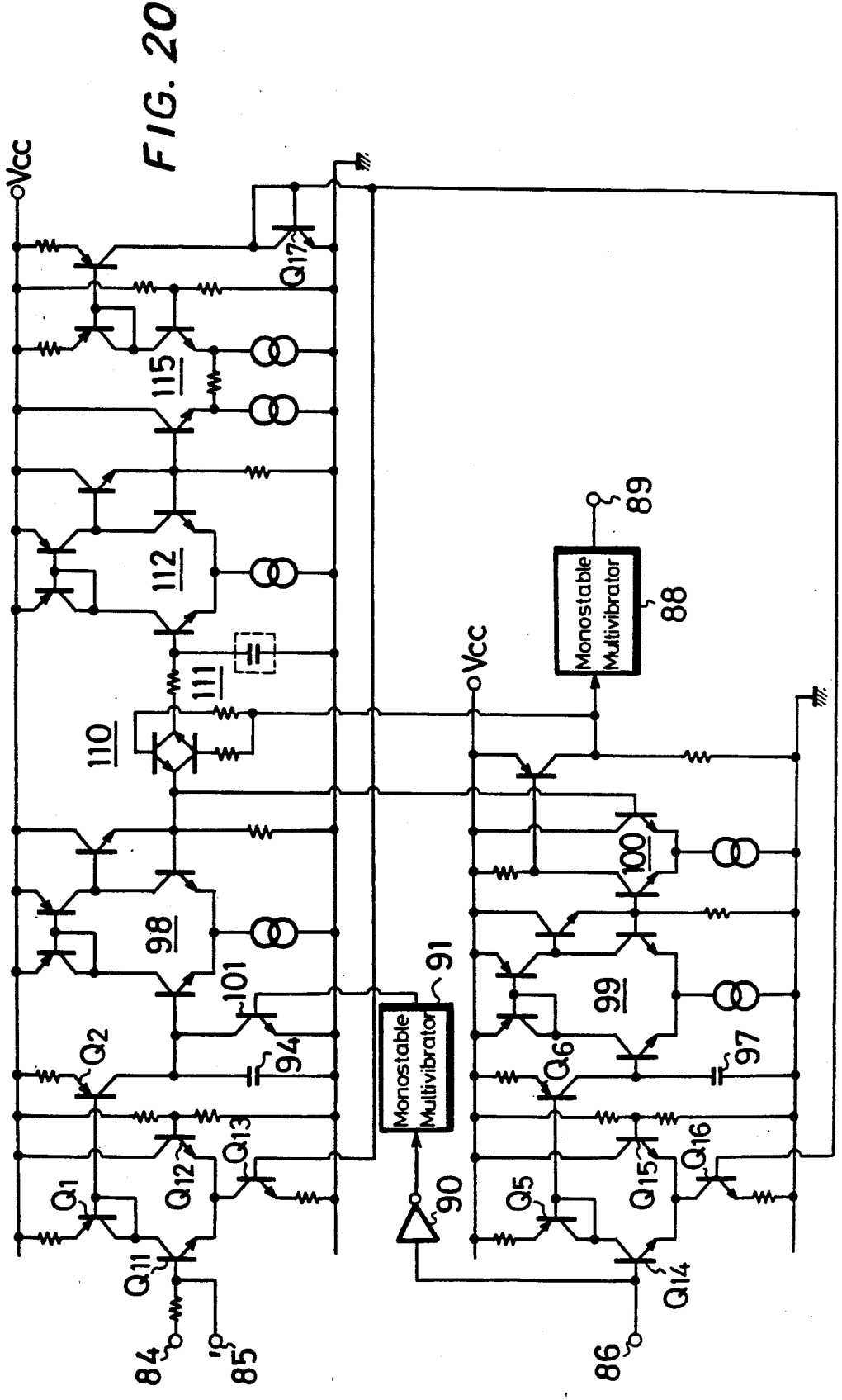

FIG. 20 shows an example of its practical circuit. In the figure, like parts corresponding to those in the figure are marked with the same references. Further, a capacitor encircled by a broken line is connected from the outside to the IC.

Figure 21:
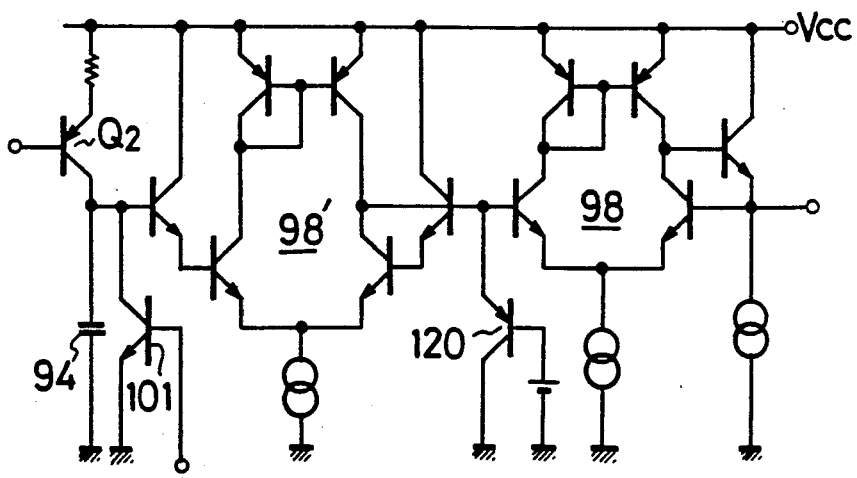

If this circuit is formed as a feedback circuit arrangement, there is a risk that a mis-operation will occur during the transient period such as powering the circuit and so on. Therefore, as shown in FIG. 21, a buffer amplifier 98' of high input impedance is connected to the preceding stage of the buffer amplifier 98 and a limiter circuit 120 applied with, for example, D.C. 6 V is connected therebetween so as to limit the integrated output of the masking pulse, thus such mis-operation being avoided.

In other words, if the above circuit includes no limiter circuit, the capacitor 94 is rapidly charged by the feedback before each circuit portion commences the normal operation when powered. When the potential of this capacitor becomes equal to the saturation level of the capacitor 97, the comparator 100 produces no output. Accordingly, the switch 110 is not turned on so that the sampling of the feedback is not carried out and the circuit is then fixed to this state.

In consequence, by connecting the limiter circuit with the output of the capacitor 94, it is possible to prevent such mis-operation.

We claim:

1. In a ghost cancelling system having a transversal filter formed of a signal delay circuit with a plurality of taps, a weighting circuit connected to the taps of said signal delay circuit, a demultiplexer delay circuit with a plurality of taps, a switching circuit and a memory circuit connecting to a plurality of taps of said demultiplexer delay circuit and to said weighting circuit, said transversal filter being connected to receive a video signal, said transversal filter producing a ghost cancelling signal, a composer circuit connected to receive said video signal and said ghost cancelling signal, a detecting circuit connected to the output of said composer circuit for detecting a ghost level during a predetermined period relative to a reference time point in the signal produced by said composer circuit, and means for supplying a signal to said demultiplexer in response to operation of said ghost level detecting circuit, said ghost level detecting circuit comprising:

a masking pulse forming circuit for producing a masking pulse relative to said reference time point;

a reference time point detecting circuit for detecting said reference time point;

a circuit connected to receive an output of said reference time point detecting circuit for forming a standard waveform;

a circuit for subtracting said standard waveform from the composite output produced by said composer circuit; and a circuit connected to receive said masking pulse and the output of said subtracting circuit for producing a pilot signal, means for supplying said pilot signal to said demultiplexer, and a circuit for detecting a signal from said demultiplexer derived from said pilot signal for controlling operation of said switching circuit.

2. A ghost cancelling system according to claim 1, wherein said masking pulse and said reference time point are derived from said ghost level detectin circuit, and including means responsive to the timing of said pilot signal, the signal from said demultiplexer and a reference time pulse for generating said signal for controlling said switching circuit.

3. A ghost cancelling system according to claim 2, including means for supplying said masking pulse to a first integrator, means for generating a reference time point pulse and for supplying said reference time point pulse to a second integrator, comparing means for comparing the outputs of said first and second integrators, means responsive to an output signal from said demultiplexer for stopping the integrating operating of said first integrator, and means for supplying the output of said comparing means to said switching circuit.

4. A ghost cancelling system according to claim 3, in which said first and second integrator circuits comprise a combination of current mirror circuits and capacitors, and at least one of said current mirror circuits includes a circuit for controlling current gain.

5. A ghost cancelling system according to claim 3, wherein said first and second integrator circuits comprise combinations of current mirror circuits and capacitors, and including common current control means connected to each of said current mirror circuits.

6. A ghost cancelling system according to claim 3, wherein said first and second integrator circuits comprise combinations of current mirror circuit and capacitors, means for comparing the level of an output from said first integrator circuit with a fixed level, and closed loop means for controlling the current of each of said current mirror circuits in response to the output of said comparing means.

7. A ghost concelling system according to claim 6, including a limiter circuit connected between said first integrator circuit and said comparing means.

8. A ghost cancelling system according to claim 3, including a reset circuit for said first integrator circuit operative to reset said first integrator circuit except during operation of said ghost level detector circuit.

* * * * *